UNITED STATES PATENT OFFICE.

GRANVILLE MOORE, OF SAN FRANCISCO, CALIFORNIA.

PROCESS OF MANUFACTURE OF BLANC FIXE.

1,388,285. Specification of Letters Patent. Patented Aug. 23, 1921.

No Drawing. Application filed August 13, 1919. Serial No. 317,384.

*To all whom it may concern:*

Be it known that I, GRANVILLE MOORE, a citizen of the United States, residing at San Francisco, in the county of San Francisco and State of California, have invented certain new and useful Improvements in Processes of Manufacture of Blanc Fixe, of which the following is a specification.

The present invention is an improved method for the manufacture of blanc fixe.

The object of the invention is to provide a pure white blanc fixe (precipitated barium sulfate).

Blanc fixe has several trade uses, such as pigments, coatings for papers and the like, and its value is very largely determined by the degree of purity. When it is of pure white quality it commands a price greatly in excess of those grades in which impurities occur.

The principal impurities in crude barytes are silica and silicates and sulfids of iron, lead and copper. My improved treatment contemplates the separation of these impurities to leave a pure barium sulfate possessing good covering qualities.

My process is as follows:—

The crude barytes ground to any suitable fineness, preferably 200 mesh, is mixed with sodium chlorid and alkali metal nitrates or carbonates or both, and the mixture is then subjected to fusion.

After fusion of the barytes in the sodium chlorid flux, either with or without the addition of other fluxes such as alkali metal nitrates or carbonates or both, the fused mass is quickly chilled either by discharging it, in a molten condition, into water, or upon some cool surface. The sodium chlorid is used as a solvent for the barium sulfate and the alkali metal nitrates and carbonates form a flux for the impurities rendering them easily fusible. This permits them to readily settle out in the fused mass. The barium compounds are then drained in a pure condition by removing upper stratas of the fusion. The clear fused mass may be further separated from slag by permitting the fusion to flow through intermediate settling pots before discharging it into the water.

The following equations are given as illustrations of the reactions involved, but they will vary depending upon the percentages of impurities in the crude barytes.

(1) $SiO_2 + Na_2CO_3 = Na_2SiO_3 + CO_2$.
(2) $FeSiO + Na_2CO_3 = Na_2FeSiO_4 \ CO_2$.
(3) $FeS + 2NaNO_3 + SiO_2 =$
$Na_2FeSiO_4 + 2NO + SO_2$.
(4) $PbS + 2NaNO_3 + SiO_2 =$
$Na_2PbSiO_4 + 2NO + SO_2$.

If an excess of carbonates is used, some barium carbonate will be formed. This would then remain with the precipitated barium sulfate formed later in the process, and would have to be converted to sulfate by sulfuric acid.

After discharging the fused mass into water, the pure barium sulfate slime is filtered out and washed free from salt. The salt is thus recovered for further fusions and a pure barium sulfate obtained which has good covering qualities.

I claim a definite advantage in that step of my process in which the fused mass is discharged into cold water. If it is permitted to cool slowly, crystalline barium sulfate is obtained when the sodium chlorid is dissolved out, and this crystalline product has very little covering quality as a paint. However, when the fused mass is submitted to the shock incident to its precipitation in the cold water, an explosion effect takes place, which produces a pure barium sulfate possessing excellent covering qualities.

Having thus described my invention what I claim as new and desire to secure by Letters Patent of the United States is as follows:—

1. The method of producing blanc fixe which consists in mixing crude barytes with sodium chlorid and alkali metal nitrates and carbonates and then subjecting the mixture to fusion, then chilling the fused mass by discharging it into cold water.

2. That step in the process of making blanc fixe which consists in subjecting a fused mass containing barytes, sodium chlorid and alkali metal nitrates and carbonates to a shock treatment by precipitating said mass into cold water.

3. The method of producing blanc fixe which consists of mixing finely divided crude barytes with sodium chlorid and alkali metal nitrates, subjecting the mixture to fusion, then chilling the fused mass by discharging it into cold water.

In testimony whereof I affix my signature.

GRANVILLE MOORE.